Patented May 5, 1925.

1,536,308

UNITED STATES PATENT OFFICE.

WILLIAM FREDERICK REMUS, OF RANGATAUA, NEW ZEALAND, ASSIGNOR OF ONE-SIXTH TO ALEXANDER EDMUND MACREDIE, ONE-SIXTH TO CHARLES FREDERICK CORK, THREE-TWELFTHS TO ALAN MacKENZIE McNEIL, AND THREE-TWELFTHS TO WILLIAM JOHN ABBOTT, ALL OF AUCKLAND, NEW ZEALAND.

PROCESS FOR THE PREPARATION OF MEAT POWDERS.

No Drawing. Application filed November 17, 1921. Serial No. 515,786.

*To all whom it may concern:*

Be it known that I, WILLIAM FREDERICK REMUS, subject of the King of Great Britain, residing at Rangataua, in the Dominion of New Zealand, have invented a new and useful Improvement in a Process for the Preparation of Meat Powders, of which the following is a specification.

This invention relates to a process that has been devised for the preparation of meat powders from fresh meat of warm blooded animals or mammals, but more especially sheep and cattle, and by the employment of which process an article of food is produced that will keep sweet and palatable under all normal conditions and in which all the natural properties of the meat as a food for human beings are retained.

This article is useful in the culinary arts of domestic and manufacturing cooking, being a suitable substitute for fresh and cured meats, also valuable for the preparation of invalid foods and medicines.

By the subjection of the meat to the process hereinafter described, the meat is deprived of those elements that cause meat to decompose and to become stale or unpalatable and all the palatable and nutrimental qualities, including the finer fats and protein and mineral elements, are retained therein.

The essential features of the process consists in the subjection of the meat to an initial heating operation to loosen the fats and juices right through the body of the meat, and to the expressing of such fats and juices therefrom, in the subjection of the expressed matter to a sterilizing, clarifying and concentration treatment and then re-incorporating them with the meat, (in whole or in part) and the submission of the whole to a drying operation at a low temperature, and a final grinding of the dried matter into a fine powder.

The process is carried out in the following manner:—

The meat is taken from a carcass that has thoroughly set and cooled, and is first boned and has all kidney or caul fat removed from it, and is then cut into pieces or roughly minced. This meat is placed in suitable trays and spread evenly therein to a depth of about three inches and the trays placed within an oven in which a heat of 135° Fah. is maintained, and allowed to remain there for about two hours. After this period has elapsed, the trays are removed and the meat is subjected to suitable squeezing or pressing action by means of which the juices that have been loosened by the partial cooking are expressed and caught. The meat is then again broken up by mincing, and replaced in the oven for another period of two hours, the temperature of the oven being maintained at 135° Fah. After this the meat is removed and again subjected to squeezing or pressure action and the juices expressed and caught, then the meat is again broken up and replaced in the oven and retained there, still under a temperature of 135° Fah., for a period of about sixteen hours.

Meanwhile the juices, or such proportions of them as may be desired, that have been expressed from the meat at the two stages before mentioned, are strained and the fat removed. These are then heated to boiling temperature until curds are formed. These curds are pressed to squeeze the liquid therefrom and leave a residue that may be used for feeding fowls, or for use in the manufacture of cattle or animal foods. The resultant liquid is evaporated or concentrated in any approved manner until reduced to about one fourth of its volume when it is ready for incorporation in the meat being treated.

This is effected by removing the meat from the drying ovens and adding thereto any desired proportion of the concentrated juices, and thoroughly mixing the whole together so as to obtain an equal quality throughout.

The mass is then replaced in the oven and the drying operation resumed at the temperature of 135° Fah. previously employed, for a period of a further ten hours or until the whole is thoroughly dried. The meat is then removed and subjected to the grinding operation to reduce it to powder and to sieving in order to remove the sinews and fibres therefrom.

In addition to the juices being thus added to the meat, if desired, the bones removed from the meat at the commencement of operations may be boiled to produce a gravy of the meat particles remaining thereon and the marrow. This gravy is strained, and the resultant liquid is added to the meat juices before their concentration, and the whole concentrated together and added to the meat under treatment.

The drying operations herein referred to may be carried out in any suitable design of ovens or driers having provision for the carrying away of the moisture given off, or if desired, may be carried out under the well known vacuum system of drying.

I claim:—

1. The process of making meat powder which comprises heating the meat at a temperature below 140° F. to loosen the juices, then squeezing the meat to express the juices, subjecting the juices to sufficient temperature to sterilize and concentrate them, reincorporating the treated juices with the meat, subjecting the meat to a final heating operation below 140° F. to dry the same, and then grinding the dried meat.

2. The process of making meat powder which comprises reducing the meat to small particles, subjecting the meat to successive heating, squeezing and mincing operations, each heating operation being conducted at a temperature below 140° F., and each heating operating being followed by the squeezing operation to express the juices and by the mincing operation to loosen the pressed meat, subjecting the expressed juices to sufficient temperature to sterilize and concentrate them, reincorporating the treated juices with the meat, subjecting the meat to a final heating operation below 140° F. to dry the same, and then grinding the dry meat.

WILLIAM FREDERICK REMUS.